US006944450B2

(12) United States Patent
Cox

(10) Patent No.: US 6,944,450 B2
(45) Date of Patent: Sep. 13, 2005

(54) COMMUNICATIONS SYSTEM

(75) Inventor: Earl C. Cox, La Crescenta, CA (US)

(73) Assignee: Aerovironment, Inc., Monrovia, CA (US)

( * ) Notice: Subject to any disclaimer, the term of this patent is extended or adjusted under 35 U.S.C. 154(b) by 348 days.

(21) Appl. No.: 09/832,328

(22) Filed: Apr. 10, 2001

(65) Prior Publication Data

US 2001/0039189 A1 Nov. 8, 2001

Related U.S. Application Data

(60) Provisional application No. 60/196,058, filed on Apr. 10, 2000.

(51) Int. Cl.$^7$ ................................................ H04Q 7/20
(52) U.S. Cl. ...................... 455/431; 455/427; 455/12.1; 455/13.3; 455/429; 455/430; 342/355; 342/356
(58) Field of Search ......................... 455/427, 429–431, 455/12.1, 13.3; 342/355–356, 359, 367

(56) References Cited

U.S. PATENT DOCUMENTS

| | | | |
|---|---|---|---|
| 5,810,284 A | * | 9/1998 | Hibbs et al. .................. 244/13 |
| 5,884,142 A | * | 3/1999 | Wiedeman et al. .......... 455/428 |
| 5,974,315 A | * | 10/1999 | Hudson ....................... 455/427 |
| 6,061,562 A | * | 5/2000 | Martin et al. ................ 455/431 |
| 6,075,483 A | * | 6/2000 | Gross .......................... 342/367 |
| 6,285,878 B1 | * | 9/2001 | Lai ............................. 455/431 |
| 6,314,286 B1 | * | 11/2001 | Zicker ......................... 455/431 |
| 6,324,398 B1 | * | 11/2001 | Lanzerotti et al. .......... 455/431 |
| 2002/0072361 A1 | * | 6/2002 | Knoblach et al. ........... 455/431 |

FOREIGN PATENT DOCUMENTS

| | | | |
|---|---|---|---|
| EP | 0 872 966 A2 | 10/1998 | ........... H04B/7/185 |
| WO | WO 97/33790 | 9/1997 | ............. B64B/1/26 |
| WO | WO 99/13598 | 3/1999 | ........... H04B/7/185 |
| WO | WO 99/23769 | 5/1999 | ........... H04B/7/185 |

OTHER PUBLICATIONS

Martin, James N., and Coletta, Nicholas J., "Broadband Wireless Services from High Altitude Long Operation (HALO) Aircraft", Proceedings of the SPIE, SPIE, Bellingham, VA, US, vol. 3232, pp. 9–20, Nov. 5, 1997, XP000904432.

Martin, James N., and Coletta, Nicholas, J., "Broadband Wireless Communications Via Stratospheric HALO Aircraft", MILCOM '98, IEEE Military Communications Conference Proceedings, pp. 45–49, Boston, MA, Oct. 19–21, 1998.

Grace, D., Daly, N. E., Tozer, T. C., Burr, A. G., "LMDS from High Altitude Aeronautical Platforms", Globecom '99, Global Telecommunications Conference, pp. 2625–2629, 1999.

* cited by examiner

Primary Examiner—William Trost
Assistant Examiner—Sharad Rampuria
(74) Attorney, Agent, or Firm—Law Office of John A Griecci

(57) ABSTRACT

This disclosure provides a communications system using a span-loaded flying wing, traveling at relatively slow speeds, that can remain airborne for long periods of time. The communications system uses the airplane as a long term high altitude platform that can serve at lest one of a number of potential functions. One function is to link to a ground station using radio wave signals and a satellite using optical signals. Another function is to serve as a relay station between ground communication nodes and individual end-users. Because the aircraft can tightly hold a station, the end-user's antennas do not need to be continuously adjustable. For such a system, a large number of aircraft can be used, with the end-user antennas being configured for a narrow beamwidth so as to allow frequency reuse for different communication links.

21 Claims, 14 Drawing Sheets

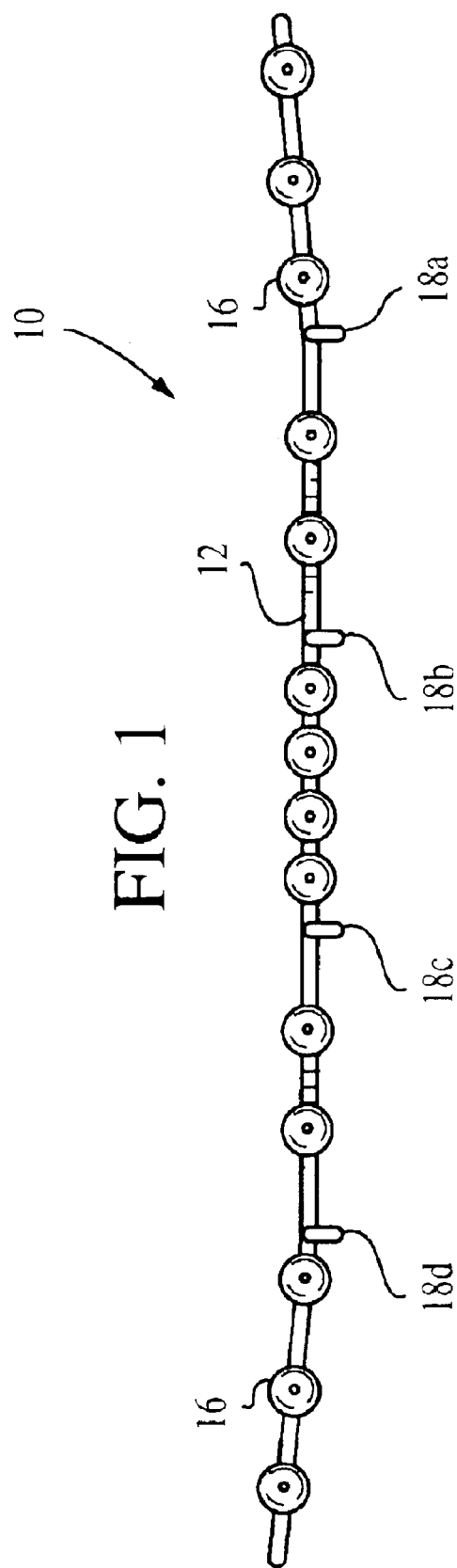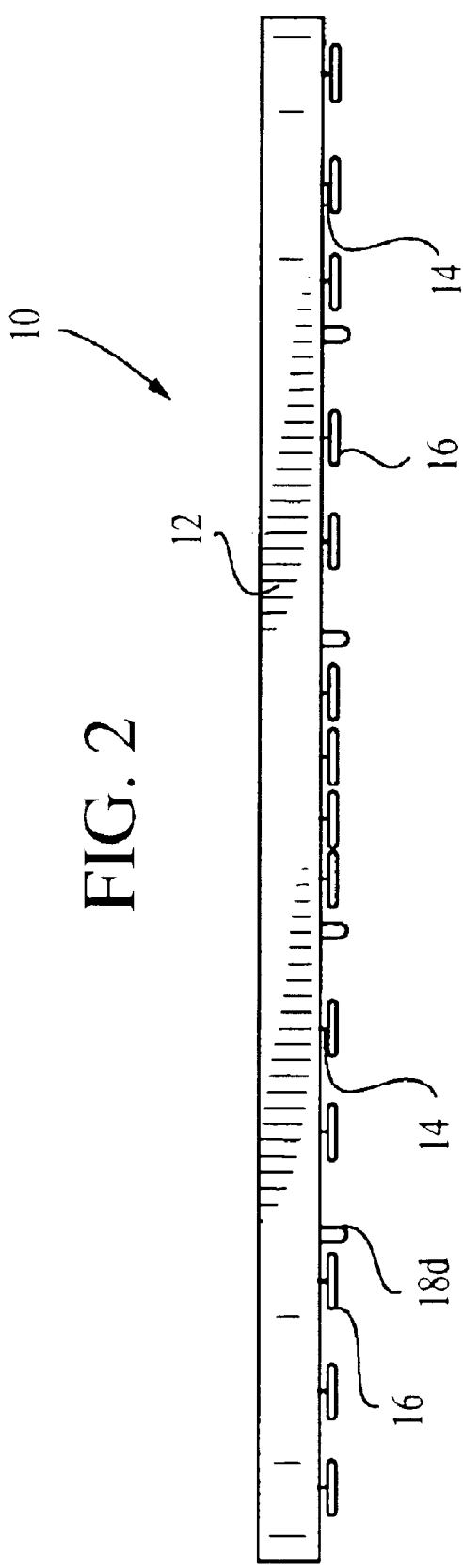

COMMUNICATIONS SYSTEM

The present application claims priority from a U.S. provisional patent application Ser. No. 60/196,058, filed Apr. 10, 2000, which is incorporated herein by reference for all purposes.

The present invention relates to wireless communications systems, and more particularly, to a wireless communications system using an airplane.

BACKGROUND OF THE INVENTION

With the explosion of INTERNET and multimedia applications, it is an increasing challenge to provide high-bandwidth, last-mile connectivity to end-users. Communications signals can be delivered to such users through a number of different types of communications systems. A wired, terrestrial system typically provides high speed communication for a large bandwidth signal. However, the infrastructure for such a system is expensive and time consuming to build, maintain and upgrade, and it does not, by itself, support mobile communications. A wireless system that uses transmission towers provides reasonably high speed communication for a substantially more limited bandwidth per the ground area served.

Geostationary Earth orbit (GEO) satellites (at an altitude of about 36,000 kilometers) can also provide wireless communications to end-users, but are limited by bandwidth efficiency, and therefore under serve highly populated areas. Medium and low Earth orbit (MEO and LEO) satellite (10,000 kilometers and 700–1500 kilometers, respectively) systems are complex in nature because end-user's are required to have equipment to track the satellites' relative movement. Furthermore, GEO satellites must be in equatorial orbits, which limits their practical use to equatorial land regions. Non-geostationary satellites require complex, continuously adjusting, directional antennas, both in the air and on the ground, typically with secondary systems adapted to switching communications signals from one passing satellite to the next. Of course, none of the above satellites are easily retrieved, e.g., for servicing.

Aircraft are used in a wide variety of applications, including travel, transportation, fire fighting, surveillance and combat. Various aircraft have been designed to fill the wide array of functional roles defined by these applications. Included among these aircraft are traditional balloons, dirigibles, fixed wing to airplanes, flying wing airplanes and helicopters.

One functional role that aircraft have not typically been designed to fill is that of a long duration, suborbital (e.g., stratospheric), high-altitude platform for communication. High altitude platforms are aircraft, stationed at high altitudes, that are relatively fixed in location. Lighter-than-air aircraft, such as balloons and dirigibles, and helicopters are both limited in their functionality as high altitude platforms by altitude limitations, and by an inability to maintain a selected station in strong winds. Airplanes, which typically travel at high speeds to reach and maintain high altitudes, are limited by an inability to maintain a selected station in calm winds. Furthermore, helicopters, some lighter-than-air aircraft, and most airplanes are unable to maintain a high-altitude station for much more than a day, let alone a significant length of time such as over a week or a month.

A number of developmental airplanes have the potential to sustain continuous day and night flight as solar-powered airplanes for as long as ample sunlight is available during the day. Three such airplanes that were actually constructed, being the well-known Pathfinder, Centurion and Helios airplanes, have set numerous flight records. The basic design underlying these airplanes is discussed at length in U.S. Pat. No. 5,810,284, which is directed toward an unswept flying wing airplane having a very high aspect ratio and a relatively constant chord and airfoil.

Long duration high altitude platforms that operate at suborbital altitudes, such as the Pathfinder, Centurion and Helios airplanes, have been suggested for use in a variety of functions. As one example, a high altitude platform equipped with microwave communications equipment could provide communication relay services between remote areas. Other types of airplanes are not optimally suited to this task because they are limited by the amount of combustible fuels that they use, which are heavy, expensive and are consumed very quickly. Typically, these other types of airplanes cannot remain over their desired location for any significant length of time, and hence, are of limited utility in performing these tasks.

It is desirable to develop a communications system that provides for high bandwidth signals to both fixed-location and mobile receivers. Various embodiments of the present invention can meet some or all of these needs, and provide further, related advantages.

SUMMARY OF THE INVENTION

The present invention solves the needs mentioned above by providing communication systems using an airplane that is inexpensive to produce and can remain aloft for long durations. These systems can be deployed quickly, are scalable to markets and market sizes, and can be serviced and upgraded with new technology. Wireless in nature, these systems can be developed to serve transportable and/or mobile users.

The present invention entails the use of a suborbital platform that can be used to convert radio wave signals from a ground station to optical signals directed to a satellite, or other spacecraft, that is above suborbital altitudes. Likewise, the airplane can be coupled with a large number of ground stations to create broadband and/or wireless networks. However, the present airplane is not only far less expensive to produce than satellites or terrestrial last-mile infrastructures; it is retrievable and may be reused for the same or different tasks.

The invention uses tightly station kept stratospheric platforms as communication nodes, being effectively geostationary relative to fixed-location users. The platforms achieve station keeping aerodynamically with electric power generated with hybrid solar energy and hydrogen fuel cells. They are environmentally friendly and produce no pollutant into the stratosphere. The payload module maintains attitude and is decoupled from the platform roll-pitch-yaw motion with gimbals. Both payload and user terminal antennas are designed to accommodate platform station keeping dynamics.

Data can be processed through ground-based gateways configured to broadcast the data to the airplane and receive data from the airplane. The platforms are at a nominal altitude of 20 KM. This is substantially closer than geostationary satellites in a 35,000 kilometer orbit, and it provides a delay latency equivalent or better than the terrestrial networks.

The communications system can use a plurality of aircraft that are spatially separated, along with frequency and polarization diversity, to bring bandwidth density efficiency to as high as 222 $MHZ/KM^2$ or more into highly populated urban areas. This also allows competing systems to coexist.

Other features and advantages of the invention will become apparent from the following detailed description of the preferred embodiments, taken in conjunction with the accompanying drawings, which illustrate, by way of example, the principles of the invention. The detailed description of particular preferred embodiments, as set out below to enable one to build and use an embodiment of the invention, are not intended to limit the enumerated claims, but rather, they are intended to serve as particular examples of the claimed invention.

BRIEF DESCRIPTION OF THE DRAWINGS

FIG. 1 is an elevational view of a preferred embodiment of an aircraft embodying the invention, in a zero stress position.

FIG. 2 is a plan view of the aircraft depicted in FIG. 1.

FIG. 5 further depicts a hand-off of communications from one satellite to a second satellite.

DETAILED DESCRIPTION OF THE PREFERRED EMBODIMENTS

The invention summarized above and defined by the enumerated claims may be better understood by referring to the following detailed description, which should be read in conjunction with the accompanying drawings. This detailed description of particular preferred embodiments of a communication system, set out below to enable one to build and use particular implementations of the invention, is not intended to limit the enumerated claims, but rather it is intended to provide particular examples thereof.

The Preferred Airplane for the Invention

The invention preferably includes the use of an airplane as a substantially geostationary platform having tight station-keeping requirements. In accordance with the present invention, the preferred airplane is of a design similar to that of the Pathfinder, Centurion and Helios aircraft, as mentioned above in the Background of the Invention. While the preferred airplane's design is described below, further details are provided in U.S. Pat. No. 5,810,284, which is incorporated herein by reference. Nevertheless, it is to be understood that designs of other aircraft for the invention can differ substantially from the described to airplane.

Figure 3:
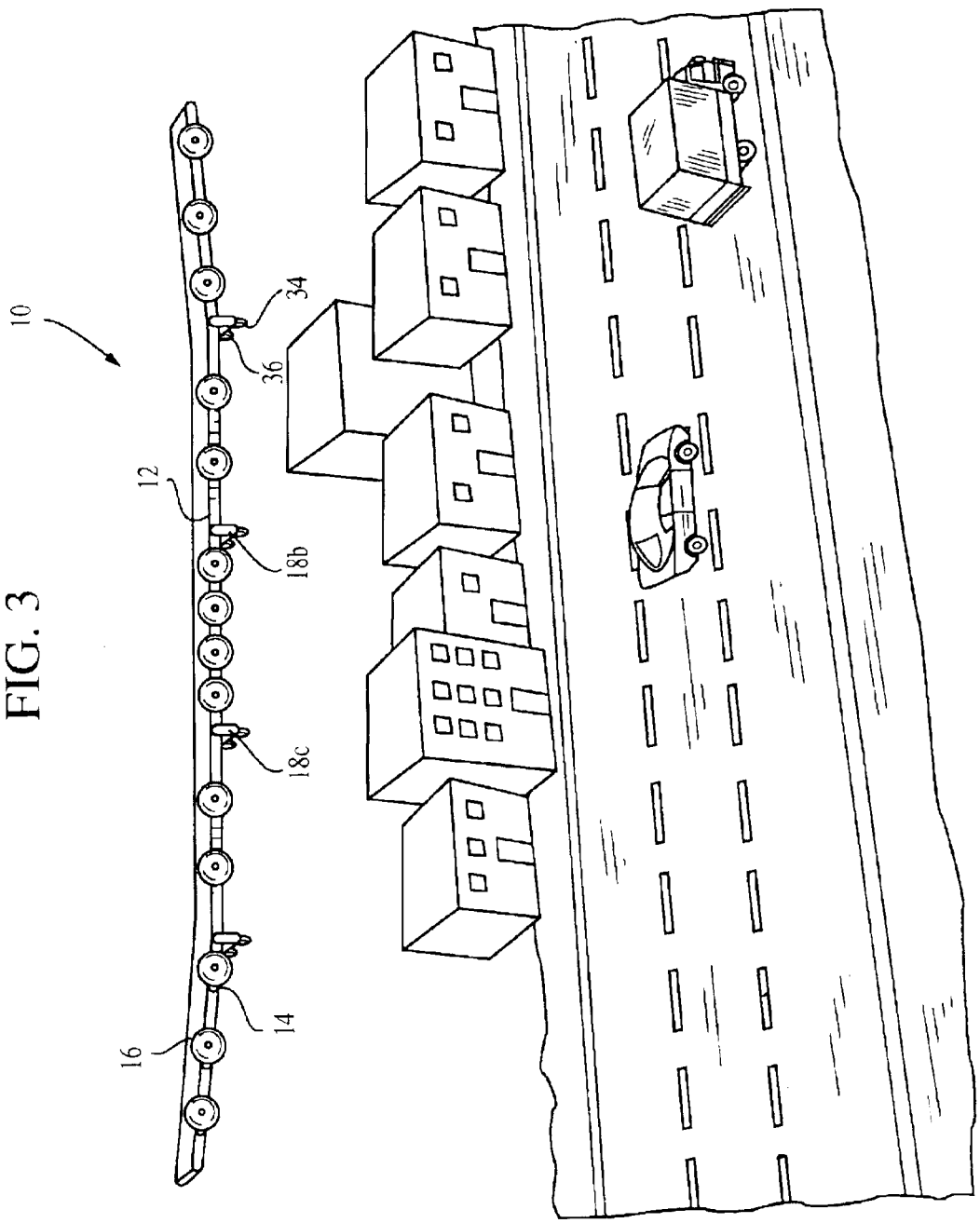
FIG. 3 is a perspective view of the aircraft depicted in FIG. 1, in a flexed position typical of loading under flight conditions.

With reference to FIGS. 1–3, the preferred aircraft embodiment is a flying wing airplane 10, i.e., it has no fuselage or empennage. Instead, it consists of an unswept wing 12, having a substantially consistent airfoil shape and size along the wingspan. Preferably, six, eight or fourteen electric motors 14 are situated at various locations along the wingspan, each motor driving a single propeller 16 to create thrust. Preferably, two, four or five vertical fins 18a–18d, or pods, extend down from the wing, with landing gear at their lower ends.

The preferred airplane 10 is solar-powered, and includes fuel cells to store energy for continuous day and night flight. It is therefore ideally suited to fly continuous, unmanned missions of over a week to ten days, (e.g., 200 hours) and more preferably, of 3000 hours, or longer. Alternatively, it can be designed to derive some or all of its power from hydrogen fuel (such as liquified hydrogen to be used in either a fuel cell or a conventional motor), fossil fuels or other stored fuels, or combinations of fuel sources such as solar power by day and stored non-renewable or partially renewable fuels by night.

The aircraft 10 is longitudinally divided into preferably five or six, modular segments sequentially located along the wingspan. These segments range from 39 to 43 feet in length, and have a chord length of approximately eight feet. Thus, the aircraft has length of approximately eight feet, and preferably has a wingspan of approximately 100, 120, 200 or 250 feet. The airplane's wing segments each support their own weight in flight so as to minimize inter-segment loads, and thereby minimize required load-bearing structure.

The fins 18a–18d extend downward from the wing 12 at the connection points between segments, each fin mounting landing gear front and rear wheels 34, 36. The fins are configured as pods to contain elements of the aircraft, such as electronics, and/or various payloads. One of the pods, a "control pod" is used to carry control electronics, including an autopilot principally embodied as software, to control the motors and elevators. In addition, the pods carry sensors, including global positioning system equipment, as well as communications equipment as described below.

As a result of the above design, the preferred embodiment of the aircraft is light (less than 1 pound per square foot of wing area), travels at relatively slow air speeds (from 13 knots at low altitudes to 100 knots at high altitudes), and needs relatively little electrical power from the arrays of solar cells in order to stay airborne. Its on-station performance is such that it is effectively transparent to the remainder of the communications system (i.e., the remainder of the communications system is not affected by the flight of the airplane so long as the airplane maintains its station).

Groundlink System

Figure 4A:
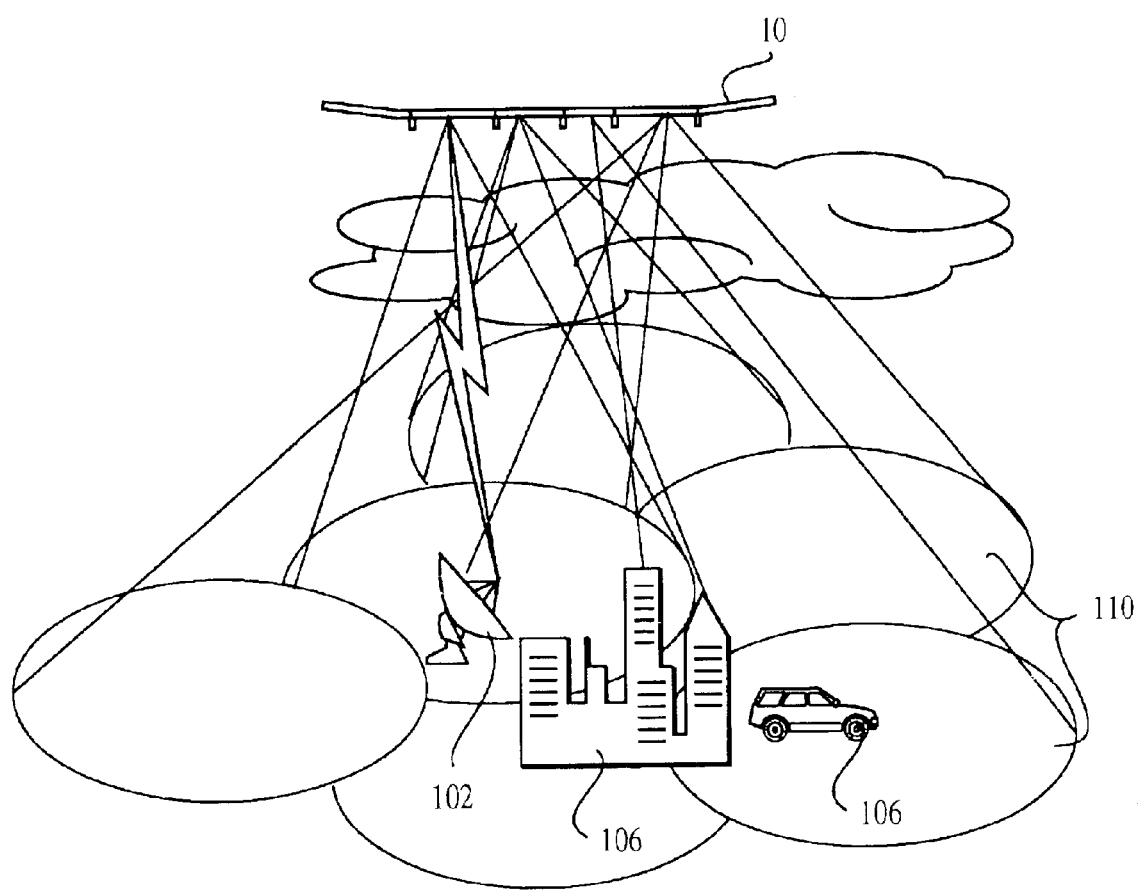
FIG. 4A is an illustrative view of the aircraft depicted in FIG. 1, acting as a high altitude platform in a communications system, to pass signals between a ground station signals and a plurality of end-users.
Figure 4B:
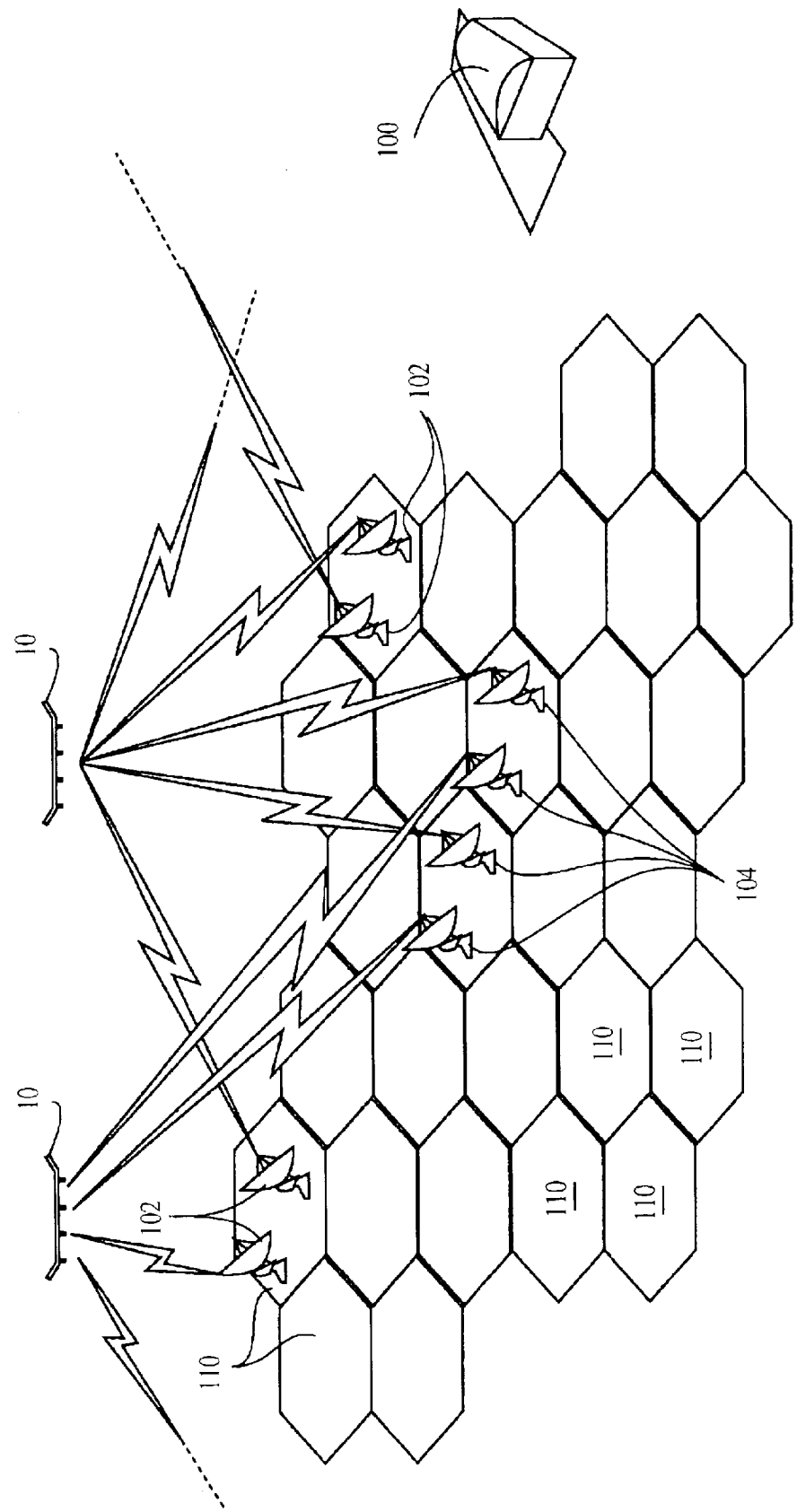
FIG. 4B is a conceptual view of a plurality of aircraft like the one depicted in FIG. 1, acting as high altitude platforms in a communication system, to pass signals between a plurality of ground stations and a plurality of end-users in a plurality of cells.

FIGS. 4A and 4B depict the system concept of a first system embodying the communication system of the invention. The system includes one or more airplanes 10 serving as tightly station kept stratospheric platforms, which are used as communication nodes, and communications equipment located both on the platform and on the ground.

The ground-based communications equipment includes one or more "gateways" 102 (i.e., terrestrial communication nodes that broadcast signals to, and/or receive signals from, one or more of the aircraft-platforms). The ground-based communications equipment also includes one or more end-user terminals (i.e., communications equipment for one or more end-users), each having a terminal antenna 104, at one or more end-user locations 106. The terminal antennas can each broadcast signals to, and/or receive signals from, one of the aircraft-platforms. Multiple terminal antennas can be used to access the signals from different aircraft for a single end-user, thus increasing bandwidth.

Data to be communicated to or from an end-user 106 at a user terminal is transmitted between a gateway 102 and the end-user's user terminal via the airborne communications equipment. In particular, the end-user data are preferably processed and transmitted between one or more of the gateways and one or more of the airplanes 10.

The airplanes 10 are maintained substantially geostationary relative to the gateways 102 and end-user locations 106 that are not mobile. More particularly, these airplane-platforms are maintained within a beamwidth of a terminal antenna 104. Each platform preferably maintains a position at an altitude of 20 KM over a selected coverage area, or cell. It preferably stays inside a 600-meter turning radius and ±30 meter vertical altitude over all environment conditions. Compared with a GEO satellite, this communications system will likely have a delay latency equivalent or better than terrestrial networks.

The airborne communications equipment is carried in one or more payload modules on the airplane 10, and preferably in a pod 18 (see, FIGS. 1–3). This equipment maintains its attitude, and is decoupled from the platform roll-pitch-yaw motion with gimbals. Both the airborne communications equipment (the payload) and the end-user terminal antennas are designed to accommodate the airplane-platform's station keeping dynamics.

The airborne communications equipment is configured to target a plurality of different cells 110 of user terminal antennas. These preferably hexagonal cells can be of varied sizes, which are preferably commensurate with the beamwidth of the airborne communication equipment, at the appropriate distance from the airplane.

Additional airplanes 10 with similarly configured communications equipment provide for additional bandwidth to the cells 110 serviced by the first airplane, and/or to additional cells. Each airplane should be spaced from the others such that they do not fly within the beamwidths of each other's associated ground antennas. This spatial diversity also serves to protect the airplanes from striking each other.

Figure 4C:
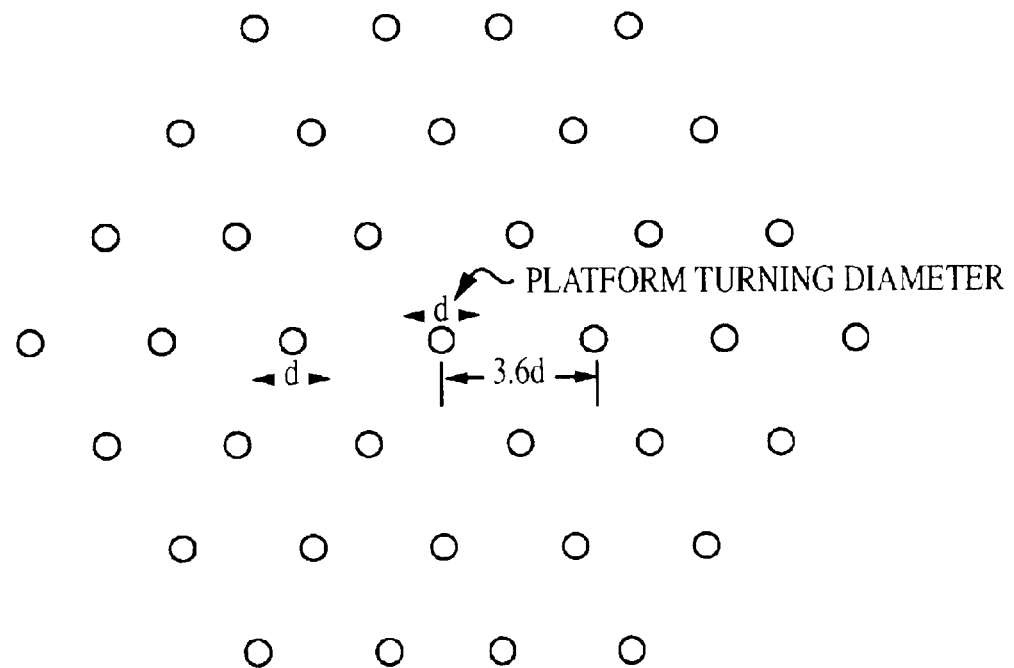
FIG. 4C is a conceptual view of a two-dimensional spacial distribution of tight stations that can be maintained by airplanes under the concept depicted in FIG. 4B.

The system can use spatial diversities (from closely packed, two-dimensionally varied platform locations, see, FIG. 4C), frequency diversity and polarization diversity to bring bandwidth density efficiency to as high as 222 MHZ/KM$^2$ into highly populated urban areas. The closely packed spatial diversity provides for substantially higher bandwidth than a one-dimensional series of orbital slots for GEO satellites. This spacial diversity can also allow competing systems to coexist.

The gateway uses 92–95 GHz for the uplink to, and 81–84 GHz for downlink from, the platforms. The frequency bands are polarization reused for each of the gateways. Preferably up to 4 spatially separated gateways with autotracking antennas process all the data from each platform. The total reuse factor of 8 yields a per-platform bandwidth throughput of 24 GHz. The gateways process and route the user data either externally through terrestrial and/or satellite networks, or internally up the platform to destination users within the coverage area. The gateway's communication links to the airplanes preferably use crosspolarization cancellation to maintain the links' performance over the worst case rain.

The communications payload on the platform is a simple transponder design for connecting the users to the gateways. The gateway antennas mutually autotrack the ground antennas. To get the bandwidth density on the user links, the multibeams are arranged in a conventional 4-cell reuse configuration. The cell size and end-to-end synchronous CDMA wave form design overcome the interference caused by the worst case platform motions.

Figure 4D:
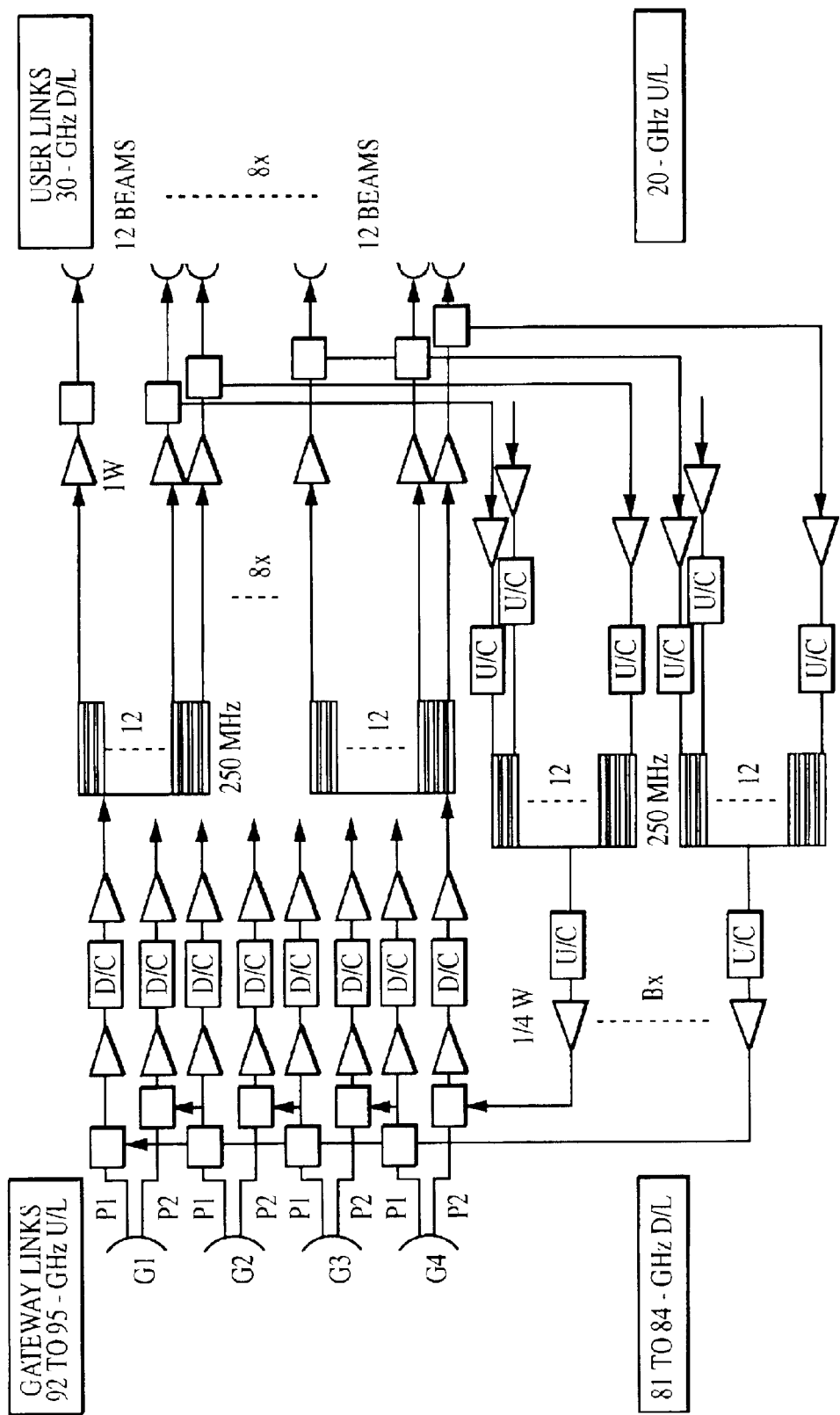
FIG. 4D diagrams an airplane communications payload design concept using the GEO satellite Ka band in reverse.

End-user communications links (from the airplane to the user terminals) can be designed for Ka or Ku bands. FIG. 4D shows such a design concept using the GEO satellite Ka band in reverse, i.e., 19.7–20.2 GHz uplink from, and 29.5–30.0 GHz downlink to, the end-users. The 500 MHZ available bandwidth is divided into two 250 MHZ in the 4-cell reuse plan. With the 24 GHz gateway bandwidth throughout, the payload supports 96 user beams. This achieves bandwidth density of 6 MHZ/KM$^2$ if the corresponding cell size is 8 KM hexagonal.

Figure 6:
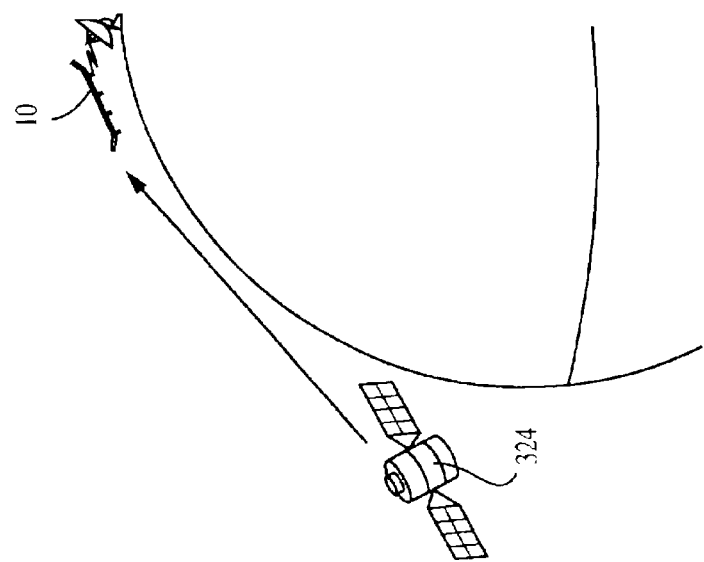
FIG. 6 is an illustrative view of a communications system similar to that of FIG. 5, where the satellite is at a significantly different latitude than the ground station.

The users' terminal antennas must have a sufficient beamwidth to accommodate the platforms' station keeping maneuvers. Simultaneously they must be narrow enough to allow multiple platforms to operate over the same coverage area to further increase the bandwidth density if demand rises. Corresponding to the FIG. 4D payload, 30 cm diameter antennas are used for cells directly underneath the platform, while 45 cm antennas are required for cells at the fringe of the coverage area, to close the link for the nominal E1 (2.048 MBPS) data rate. The sidelobe level of these antennas at Ka band allows hexagonal packing of 37 platforms as shown in FIG. 6 with minimum mutual interference. This increases bandwidth density in the overlapping region to 222 MHZ/KM$^2$. The interference between the GEO Ka band terminals and this system can largely be mitigated with spatial separations.

Preferably, one or more operation center(s) 100 command and control the flying airplane-platforms (see, FIG. 4B). They also command and control additional airplane-platforms that are available for substitution to ensure the overall system availability with 99.9% reliability, and to maintain the system while individual airplanes are serviced. Preferably, the operation centers control a fleet of airplane-platforms, which can be simultaneously maintained in the appropriate stations for the terrain below. Preferably, after a first airplane has substituted for a second, the second airplane can be directed to a remote landing strip to avoid inclement weather. Because of the sectional construction of the aircraft, and because of the size of the sections, the aircraft can then be disassembled and carried by normal trucks to a runway closer to the communication cells.

This system is completely scalable and can be optimized in many ways when deployed over various markets. The payload is preferably designed in increments of 6 GHz throughput corresponding to a single gateway. The antenna beams will be selectively populated to cover necessary cells 110.

Payloads (i.e., the airborne communications equipment) can be upgraded and reconfigured when platforms are retrieved for maintenance. The platform can be optimized for tighter station keeping with smaller payloads. Correspondingly the cell size can be reduced for higher bandwidth density. In turn the overall system capacity can be maintained with multiple platforms over a coverage area.

Satellite Downlink System

Figure 5:
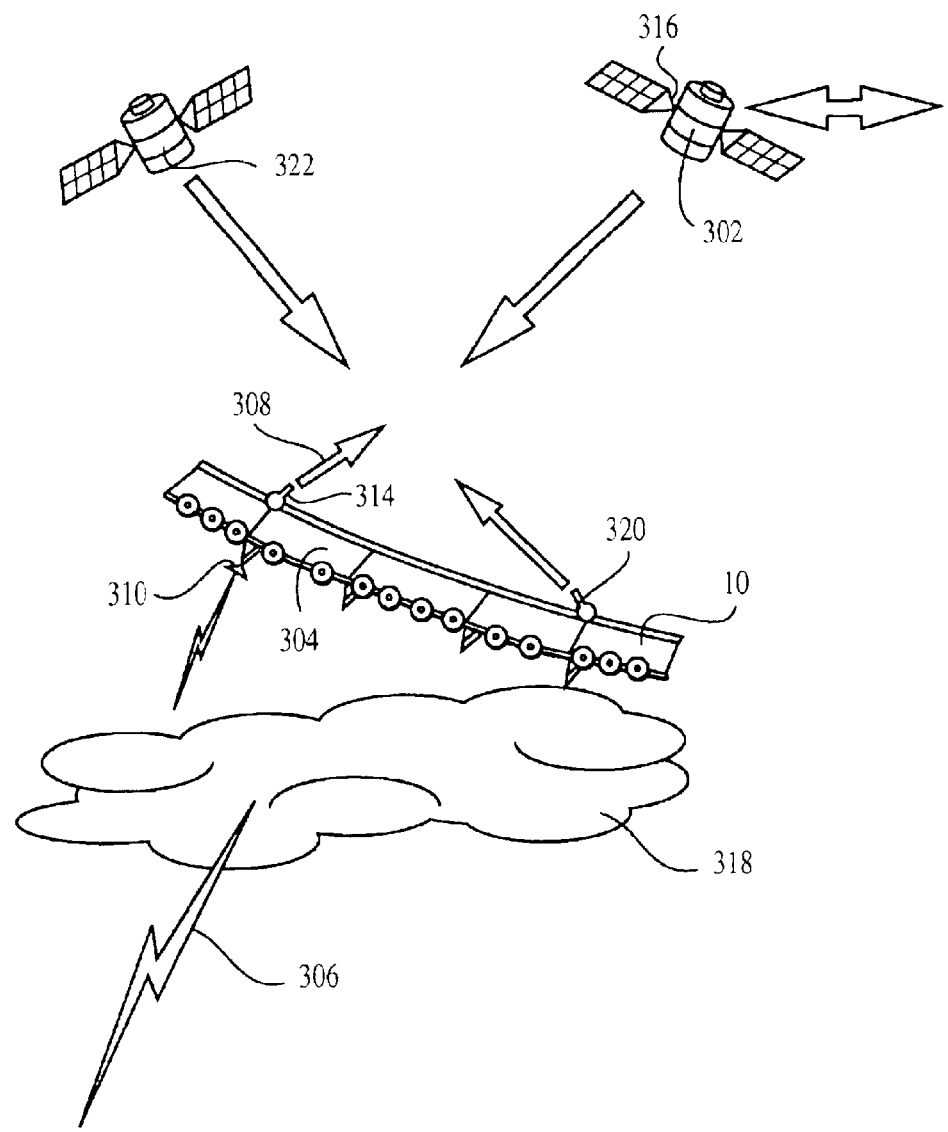
FIG. 5 is an illustrative view of the aircraft depicted in FIG. 1, acting as a high altitude platform in a communications system, to pass signals between a ground station using radio wave signals and a satellite using optical signals.

FIG. 5 depicts the system concept of a second communication system embodying the invention. The airplane 10 is used to establish a high bandwidth ground to space communication system, from a spacecraft located at orbital altitudes or higher, such as a satellite, to a ground station. More particularly, the airplane is particularly well suited to serve as part of a satellite downlink system, which would also include a satellite 302, a ground station 300, and the communication equipment supporting the signals traveling between them. This type of system can be useful in the architecture of a wide variety of communication systems.

Typically, communications between a ground station and a satellite use some type of radio wave signal, such as a microwave signal, which can pass through various atmospheric phenomena, such as clouds, without interference. Some of these signals are omnidirectional, and some are directed toward a target with a given beamwidth. However, for a given level of receiver sensitivity and background noise, the signal strength that is required to carry a particular bandwidth increases substantially with the distance between the ground station and the satellite, even if the broadcasting antenna has a relatively narrow beamwidth. Receiver sensitivity can be increased with antenna size, but that carries a mass tradeoff, which is costly for satellite systems.

Furthermore, with the limited exception of geostationary satellites, satellites follow a groundtrack crossing back and fourth over the equator that causes variation in their distance and direction from the ground station and requires large pointing adjustments in directional antennas (such as to periodically switch from satellite to satellite). Depending on the ground track of the satellite (or group of satellites), ground stations may require extensive amounts of power to maintain a downlink with distant satellites.

Therefore, the signal strength is typically a limiting factor on the available bandwidth for the downlink, and, for directional ground station, the directional antenna typically must have the ability to track its target. Furthermore, to the extent that the signal strength can be increased, the increase broadens the geographic area that will experience significant interference from the signal, particularly if the signal has a wide beamwidth or is omnidirectional (such as is used for cellular communications). In sum, the communications bandwidth is limited by the altitude of the satellite above the ground station, by the maximum ground distance (i.e., degrees latitude and longitude) between the ground station and the satellite, by receiver sensitivity (such as from antenna size), by beamwidth, and by power level. Additionally, for at least some applications, the communications bandwidth is limited by background noise levels and by limitations on the allowable interference with other location's signals. Furthermore, if narrow beamwidth ground station antennas are used to reduce the power requirements, significant costs can be incurred and additional risks of failure can occur due to the precision of the tracking requirements.

Satellite-to-satellite communication signals, or satellite to non-orbiting spacecraft uplinks, do not necessarily suffer these types of constraints, as they can use high frequency signals, e.g., lasers or other optical signals, to achieve a broad bandwidth over large distances with limited power. Those signals can degrade rapidly when passing through atmospheric phenomena such as clouds. Therefore such high frequency communication signals are typically limited to inter-satellite communication, or to communication between satellites and ground locations that do not tend to experience atmospheric phenomena such as clouds.

The preferred embodiment of the present invention can provide for a significant increase in ground-to-space communication bandwidth by providing a suborbital platform 304 to transform a radio wave signal from a ground station 300, such as a microwave signal, to an optical signal directed toward a satellite, or other spacecraft. While this communication link could be in either direction, preferably the communication link is bidirectional.

For this function, the preferred suborbital platform, the airplane 10 of the invention, includes a microwave transceiver 310 with a downward-pointing antenna for communicating with a microwave transceiver 312 with an upward-pointing antenna at the ground station, and an optical transceiver 314 with an upward-pointing antenna for communicating with an optical transceiver 316 with a downward-pointing antenna in the satellite. The airplane is preferably elevated to an altitude above typical altitudes for substantial atmospheric optical interference, such as from clouds 318 and other atmospheric moisture, and preferably low enough to maximize signal bandwidth between the ground station and the airplane. Preferably the airplane has a plurality of antennas for ground stations, each of these ground-oriented antennas preferably being aimable.

Most preferably the airplane operates between the altitudes of 50,000 feet and 70,000 feet, and does so for 200 hours or longer (and more preferably for 300 hours or longer). The communications system created, using this airplane, preferably operates at a ground station microwave power level that would prohibit significant communication (i.e., communication of a significant bandwidth) over the distance between the ground and low-orbit altitudes.

Preferably, the airplane is stationed in a relatively stationary position with respect to the ground, thus limiting or removing the necessity for the ground station to track the airplane. In particular, the airplane preferably operates within a 7000-foot diameter circle, and with a 1000 foot altitude range, and more preferably substantially within or close to a 4000-foot diameter circle. Furthermore, the airplane preferably operates within a 1000 foot vertical range, or more preferably within or close to a 100-foot vertical range.

Acting as a suborbital platform to relay radio wave signals 306 from a ground station 300 through to a satellite 302 using optical signals 308, the airplane provides numerous advantages, and can conduct various missions. For example, such an airplane can be quickly replaced if it develops mechanical difficulties. Likewise, such airplanes can operate within a relatively close distance to each other, using frequencies that could interfere with each other at higher power levels (for broad beamwidth or omnidirectional signals), because the radio wave signals to each of the airplanes are of a substantially lower power level than would be required to provide a similar bandwidth to a satellite in orbit. This can be further augmented with a closed loop signal-strength control system to minimize power usage to necessary levels for the various signals.

By using upward-pointing ground antennas and/or downward-pointing satellite antennas having limited beamwidth, the power usage can be further minimized. Each of these aimable antennas delimits an area of airspace that the airplane must remain within. If both an upward-pointing ground antenna and a downward-pointing satellite antenna are used, they must be aimed to mutually define an area of airspace within which the airplane can maintain a station-keeping flight pattern.

To maintain station within the delimited airspace, the airplane will preferably be a slow flying airplane. The flight pattern will typically be aspirin shaped, being generally circular, with a certain amount of allowed vertical variation. However, it should be understood that in high wind conditions, the preferred flight pattern could vary from a zigzagging pattern where the airplane tacks back and forth in a generally upwind direction, to a straight upwind flight.

The airplane can function to facilitate communication between a single ground station and a single spacecraft, such as a geostationary (or other geosynchronous) satellite, or it can communicate with a series of lower orbiting satellites that sequentially pass within the airplane's range of optical communication, as depicted in FIG. 5. Preferably, an airplane designed for switching between satellites will include two optical communications devices 314, 320, so as to acquire a communication link with a second satellite 322 before breaking its communication link with the first satellite 302.

As depicted in FIG. 6, in another system embodying the invention, the airplane 10 can be used at more northern or southern latitudes, where constant and direct access to communications satellites might not otherwise be readily available. By stationing the airplane at adequate, suborbital (preferably stratospheric) altitudes, the airplane can establish communications with satellites 324 that are more than 80 degrees latitude away, the satellite likely being closer to the Equator.

In a related aspect, the airplane can advantageously take advantage of most any non-equatorial station by using directional signals that reuse wavelengths that are dedicated to equatorial satellites. In particular, a particular ground station can directionally broadcast two different signals using the same wavelength, by directing one toward a geosynchronous satellite and the other toward the airplane. Unlike non-equatorial satellites, the airplane is not required to cross the equator, and thus the ground station need not periodically switch to a new broadcast direction (such as occurs when the ground station must switch satellites). Naturally, for a given airplane location, some ground stations will not be able to broadcast on the same frequency as is broadcast to the satellite because the two directional signals will overlap. For example, the signals might overlap if the airplane is somewhat north of the equator and the ground station is farther north of the equator. However, for a ground station significantly off the equator, it might be possible to station an aircraft on the equator and substantially below the satellite. It should be noted that this aspect of the invention is related to the first embodiment of the invention, where a ground station delivered increased bandwidth by broadcasting to two, spatially separated airplanes.

Figure 7:
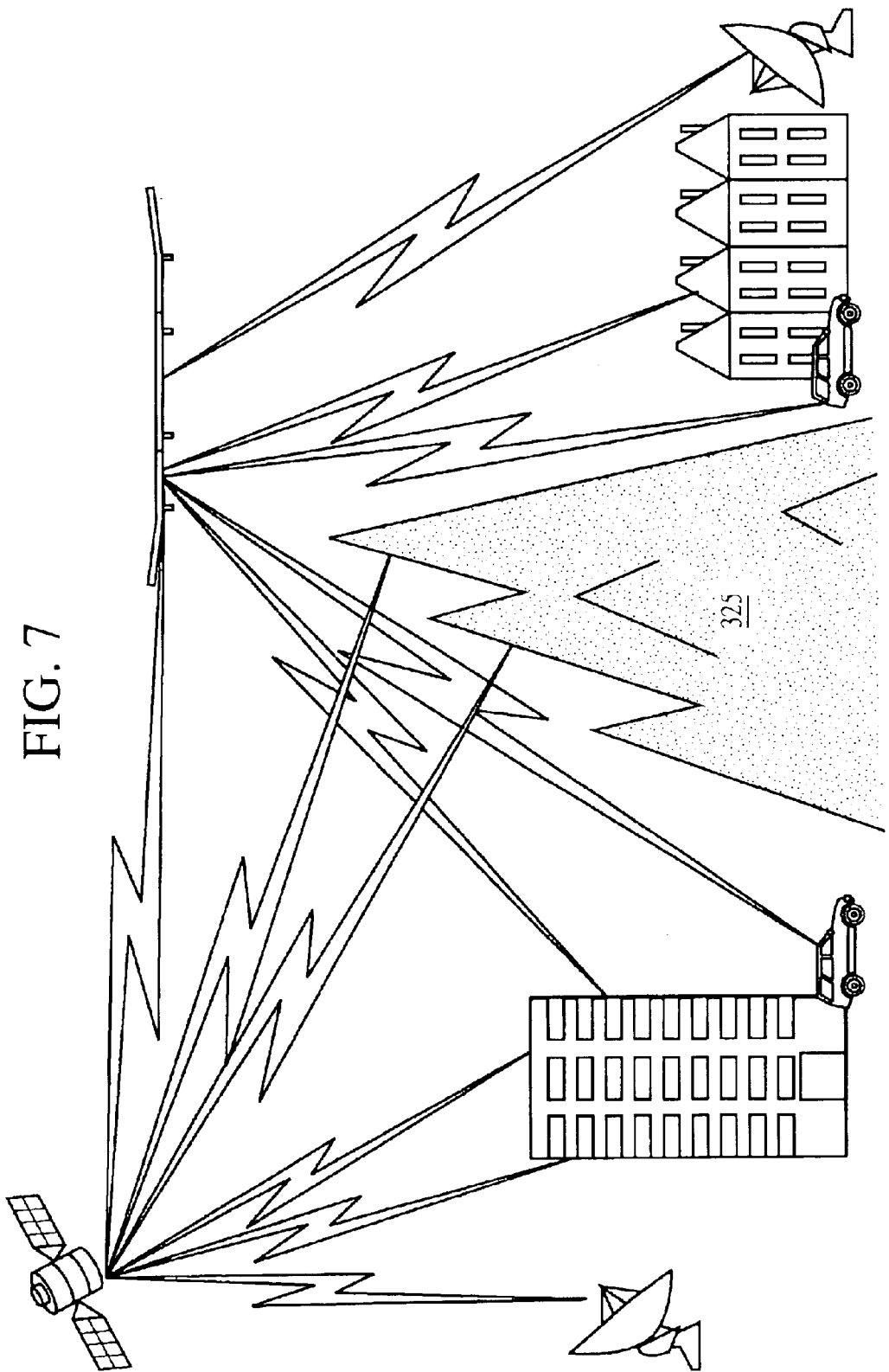
FIG. 7 is an illustrative view of a communications system similar to that of FIG. 5, where the aircraft communicates with multiple ground stations and the satellite is obstructed from one or more of the ground stations by a mountain.

As depicted in FIG. 7, an embodiment of the communication system can be used to circumvent mountains 325 and other obstacles. This feature can be used for ground station to satellite linkups, and likewise used for ground station to ground station linkups. This is a particularly effective use of the system, since neither ground stations nor satellites are typically repositionable without great effort and/or expense. One potentially effective use for such a system is overcoming the effect of obstacles on signals that are widely broadcast, such as television signals. The source of these television signals could be a ground station, a satellite, or even another airplane. Another potentially effective use is frequency reuse in broadcasting to multiple, geographically separated ground stations using the same frequency. This is advantageous in that the satellite, being farther away, would require a narrower beam width to have separate communications with the two ground stations using the same frequency.

Another embodiment of the invention uses airplanes to serve as regional hubs, relaying communications between end-users located in spot beams, and communications networks. The communications networks can be either terrestrial based, accessed via ground antennas or space based, accessed via optical or extremely high frequency microwave links.

Figure 8:
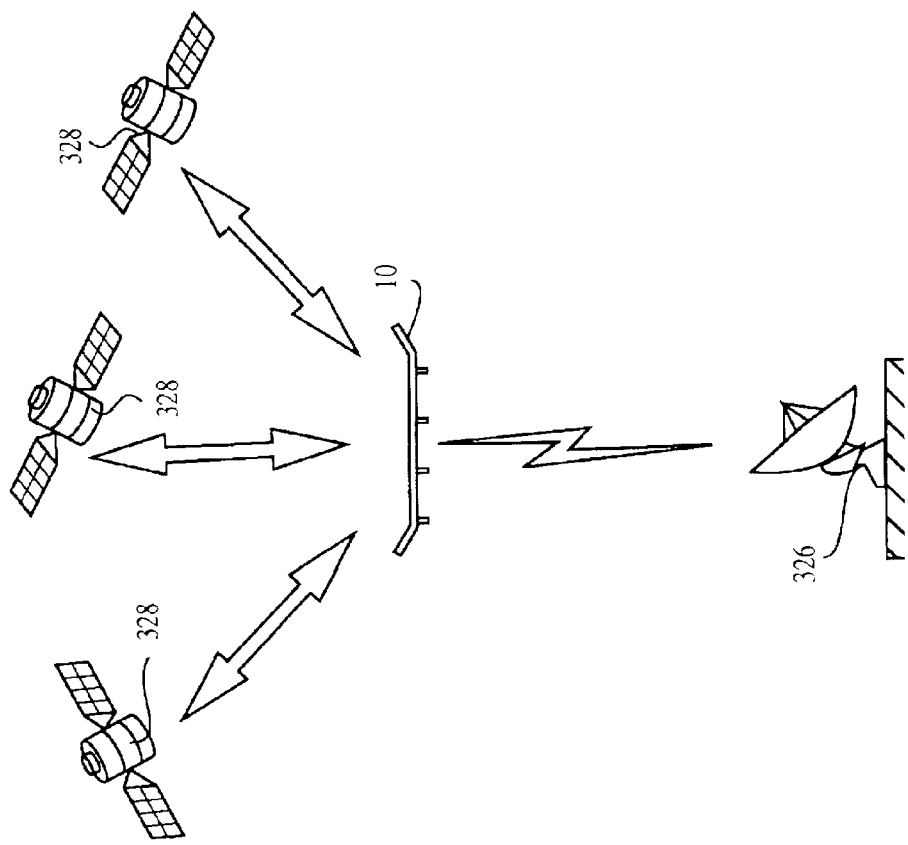
FIG. 8 is an illustrative view of a communications system similar to that of FIG. 5, where the aircraft simultaneously communicates with three different satellites.
Figure 9:
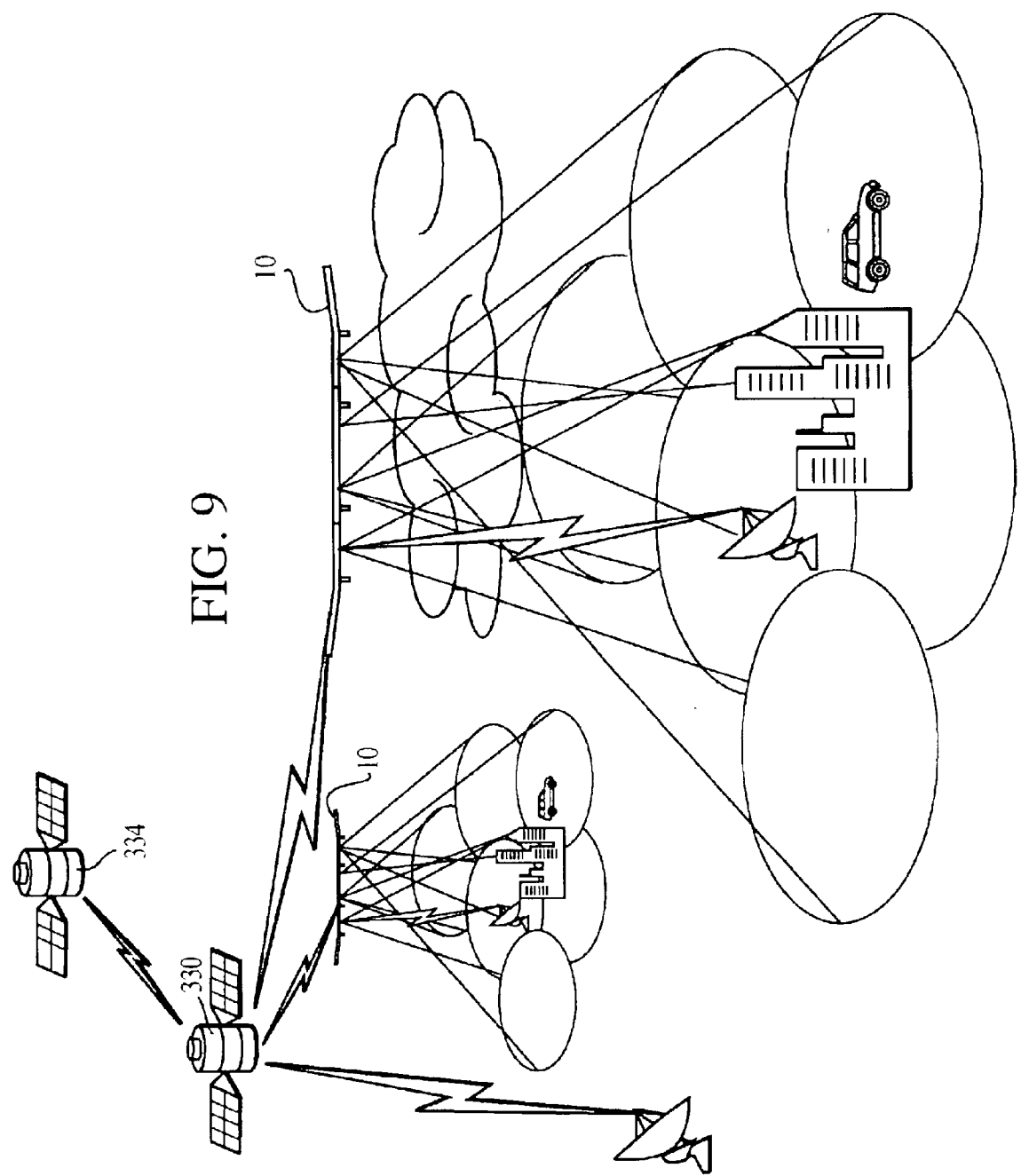
FIG. 9 is an illustrative view of a communications system similar to that of FIG. 5, where the satellite simultaneously communicates directly with two aircraft and a ground station.
Figure 10:
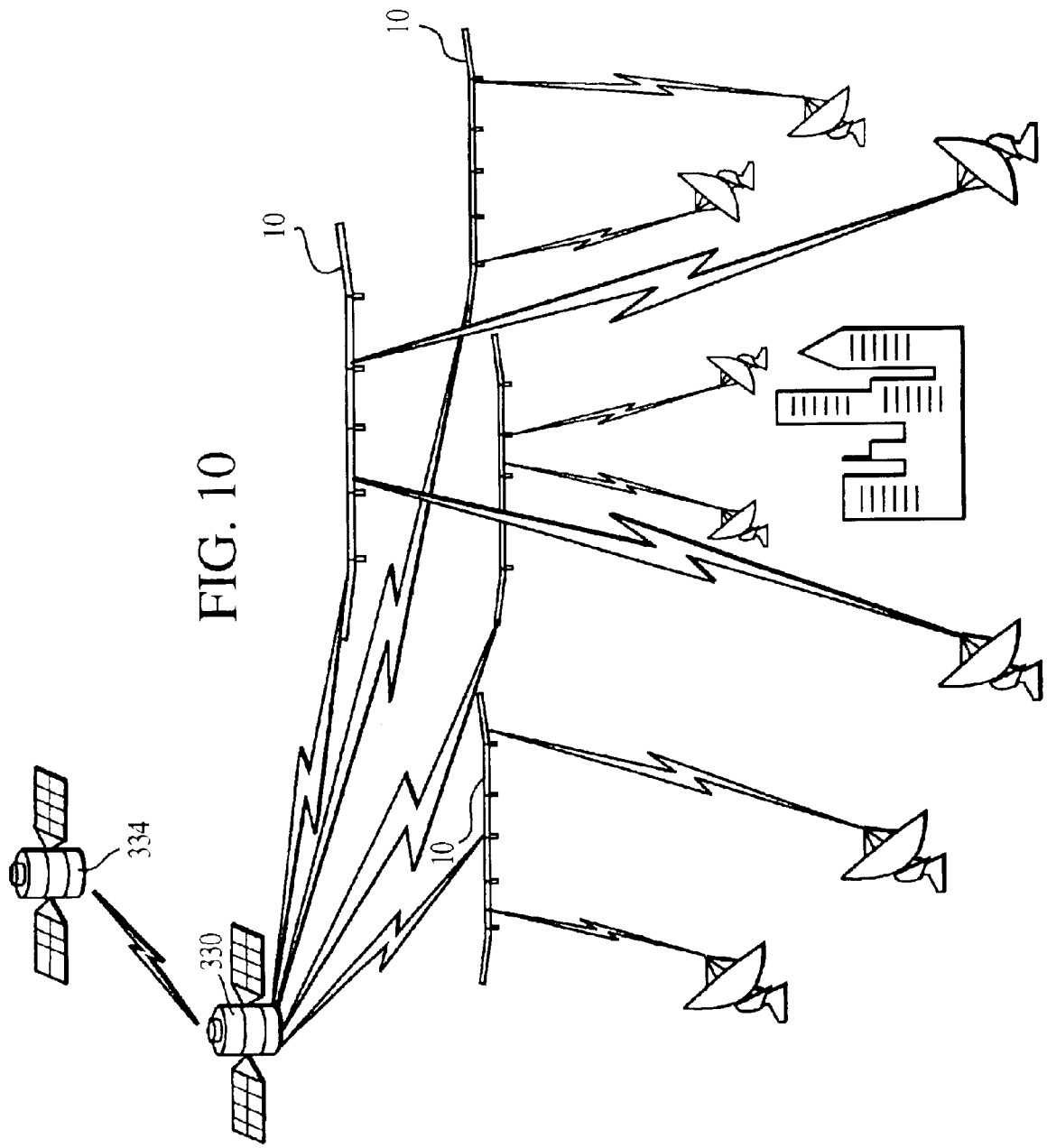
FIG. 10 is an illustrative view of a communications system similar to that of FIG. 5, where one satellite communicates with multiple aircraft, each of which serves as a base station for communicating with multiple ground stations.

One such related system, depicted in FIG. 8, uses an airplane 10 is as a communications hub, communicating simultaneously between a ground station 326 and a plurality of satellites 328. In this mission, the airplane would require a larger number of optical transceivers, and would need to generate additional power to operate the transceivers. Alternately, as depicted in FIGS. 9 and 10, two coverage regions are shown with one airplane providing coverage over each one. In particular, one or more of such airplanes 10 can all communicate with a single satellite 330, thus connecting one or more ground stations with a single satellite that acts as a communications hub. This potentially provides for frequency reuse by each airplane (i.e., each airplane can use the same set of available frequencies), increasing the available bandwidth between the satellite and the ground.

This scenario can provide for increased bandwidth between a densely populated area and a satellite (see, FIG. 10), or between a satellite and two distant locations (see, FIG. 9). The former scenario provides for extremely high amounts of data to be passed between a satellite and a city. It provides for different paths to reuse lower frequencies near the ground, and optical or extremely high frequency microwave links to communicate between the airplane and the satellite. That satellite can, in turn, act as a hub and communicate with one or more other satellites 334, which can also use suborbital platforms for ground communication. Additionally, direct airplane to airplane communications can also be used. As these examples demonstrate, the airplane can serve as part of the architecture of a variety of communications systems.

While the above-described preferred embodiment used microwave and optical signals, it should be understood that the system is operable for a wide variety of signals. In particular, it is known that atmospheric moisture interferes significantly with radio wavelengths of approximately one millimeter or smaller (i.e., higher frequency signals, above twenty gigahertz), but not as much with greater wavelengths (i.e., lower frequency signals, below twenty gigahertz). Thus, the system can preferably be operated using a ground station to airplane radio signal having a wavelength greater than one millimeter, and an airplane-to-satellite radio signal having a wavelength less than one millimeter. Furthermore, using the airplane of the above invention to redirect and/or amplify a signal, power can be conserved even if the airplane-to-satellite portion of the system operated with a signal that would pass through atmospheric disturbances, such as a signal identical to that used in the ground-station-to-airplane portion of the system.

Broadband Distribution System

Figure 11A:
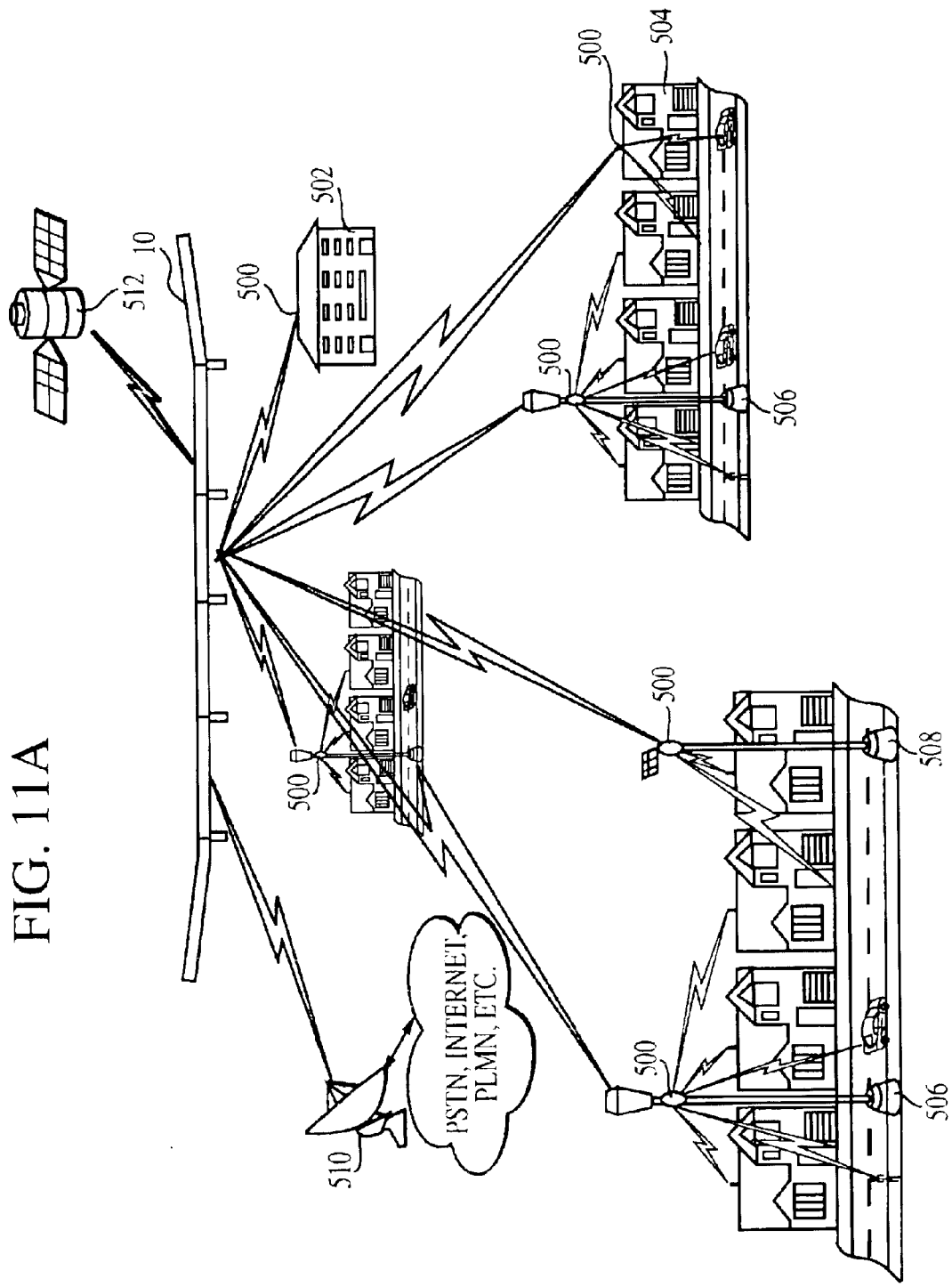
FIG. 11A is an illustrative view of the aircraft depicted in FIG. 1, acting as a high altitude, suborbital platform base station in a broadband, wireless local loop or other communications system with subscriber base stations and subscriber remote stations.

With reference to FIG. 11A, a communications system related to the first embodiment of the invention is part of a wireless local loop, broadband and/or other communications network.

Various forms of communication, such as mobile and residential voice telephony, mobile and residential Internet access, and broadband data access, each have differing transmission requirements. For example, voice telephony requires a relatively low level bandwidth (e.g., 4 to 64 KBps) for extended periods of time (e.g., 2 to 30 minutes), Internet access requires a larger bandwidth (e.g., 64 to 2000 KBps) for very limited periods of time (e.g., a few seconds), and broadband access is based upon a large bandwidth (e.g., 1 MBit or higher) on a nearly continuous basis.

To provide for such communication requirements, a variety of network architecture are typically developed, leading to various forms of networks. Included among these are land-line telephone networks, cellular networks, wireless local loops, and various stratospheric satellite-based networks.

Typically, different equipment is required to support each of these technologies. However, in some cases, such networks can serve more than one function. For example, broadband technology can be brought to fixed location end-users by the use of ASDL (asymmetric digital subscriber line) technology delivered via terrestrial wires. Nevertheless, most of these different types of networks typically require extensive and expensive infrastructures of wire to interconnect either users or cellular towers.

If satellites are used in the network, they typically have difficulties providing multiple access to users in high density areas. Development of equipment meeting the strict weight and power requirements for use in a satellite is expensive. Furthermore, support is difficult due to limited frequency reuse and the excess power margin required for transmission to less than ideal locations where mobile users can choose to go. Furthermore, significant bands of frequencies are unusable due to their inability to penetrate atmospheric moisture or other disturbances.

Cellular and PCS systems excel at penetration into buildings and hard to reach places through the use of excess power and significant frequency reuse. However, these systems require significant broadband connectivity between base stations and/or transmission towers.

For reasons such as those above, it is difficult for a communications company to initially deploy into regions that lack an existing infrastructure, or regions having a proprietary infrastructure that is not available for use. The present invention provides for an inventive network architecture that, in various embodiments, addresses one or more of these concerns.

As seen in FIG. 11A, this embodiment of the present invention includes the use of one or more high-altitude platforms, which are preferably airplanes (solar or conventional, manned or unmanned), to provide broadband point-to-multipoint connectivity between fixed ground locations. Alternatively, near Earth orbit (NEO) satellites could be used. Preferably, this high-altitude platform is an airplane 10, as described above, that circles or holds position at or close to one station relative to the ground.

The airplane serves as a suborbital platform base station that maintains preferably broadband communication signals with and between a variety of ground stations 500, typically at fixed ground locations, potentially including the roofs of subscribers' commercial buildings 502 and subscribers' residential buildings 504. At least some of the ground stations are preferably configured as base stations to distribute data or voice channels to one or more remote subscriber stations that are typically local fixed or mobile users. In addition to buildings, the ground base stations can also be integrated within or mounted on street lamps 506, signs, standalone towers 508 or other structures. The subscriber base stations (both commercial and residential) are preferably also networked to subscribers' access ports on their premises, either by wired or wireless connection. Links to other networks, such as a PSTN (public switched telephone network), PLMN (Public Land Mobile Network) or to the Internet, can be provided by separate ground stations 510, by satellite networks 512, or by access through existing subscriber base stations, where access links to such networks are available at the subscriber base stations.

Figure 11B:
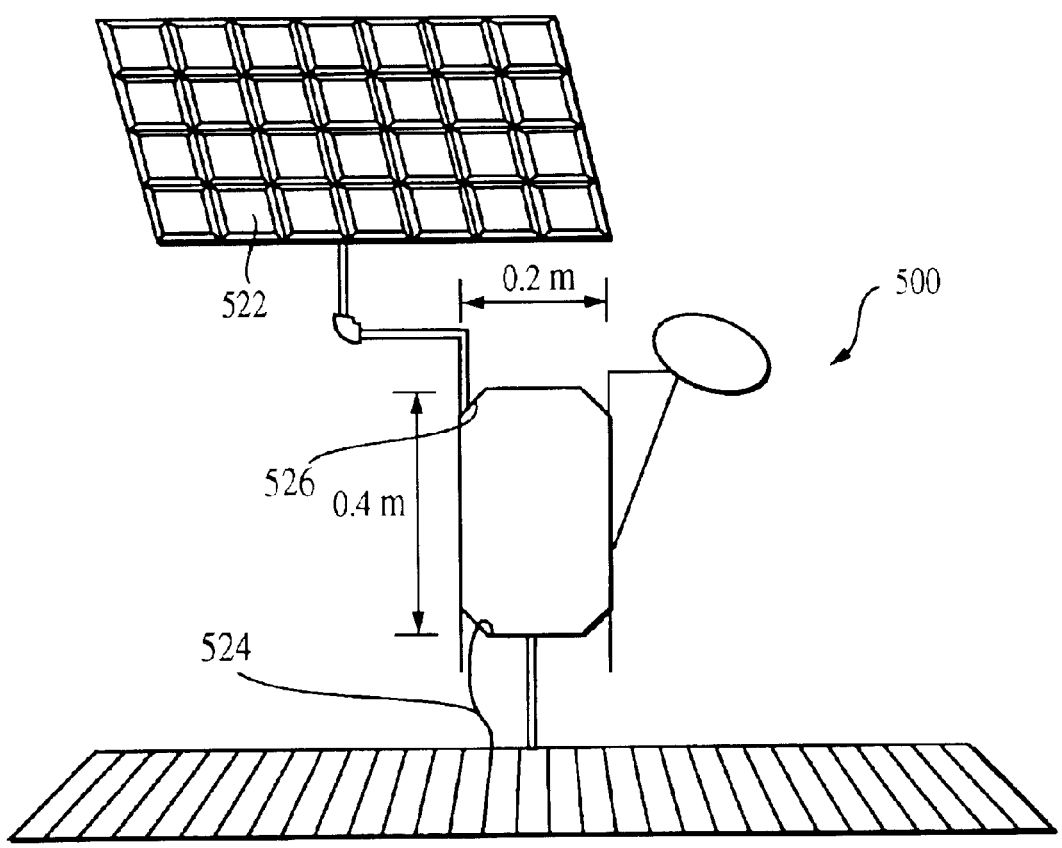
FIG. 11B is a view of a subscriber base station for use with the communications system illustrated in FIG. 17A.

As depicted in FIG. 11B, a subscriber's ground base station 500 typically is configured with an antenna 520 for maintaining a broadband or wireless loop link with the airplane. Optionally, solar arrays 522 can be used to minimize the power drawn by the subscriber base station through a power connection 524. The various forms of ground base stations can be configured to serve either individual subscribers or large numbers of subscribers. To serve other subscribers, whether mobile, or fixed in the local area of the ground base station, a wireless local loop is preferably used, although a wired network can also be used to reach fixed locations. To communicate with the other, remote subscribers, the subscriber base station preferably has an antenna 526 appropriate to the selected wireless standard of the related remote subscriber stations. As an example, the remote subscriber stations could be cordless telephones that are possessed by subscribers that are otherwise unaffiliated with the subscriber base station, its associated subscriber, and the building that it resides on.

A wide variety of communications standards, including wireless local loops, can be used in linking the subscriber base stations (or other ground base stations) to subscribers having remote subscriber stations. Compatible wireless communication standards include AMPS (advanced mobile phone service), TACS (Total Access Communications System), NMT (Nordic Mobile Telephone system), IS-95 (code division multiple access American digital cellular standard), IS-54/IS-136 (USA cellular standard, also known as D-AMPS), B-CDMA (broadband code division multiple access), W-CDMA (wideband code division multiple access), UMTS (Universal Mobile Telecommunications Service), or other 3G, PHS (Personal Handyphone System), DECT (Digital Enhanced Cordless Telephony), PACS (Personal Advanced Communication System), PDC (Personal Digital Cellular), CDPD (Cellular Digital Packet Data), Mobitex (Ericsson standard for wireless packet data networks) and RD-LAP (Motorola-developed wireless packet data network). A wide variety of services can thus be transmitted to these subscribers, including voice telephony, e-mail, Internet Access, facsimile, video telephony and video conferencing.

Figure 11C:
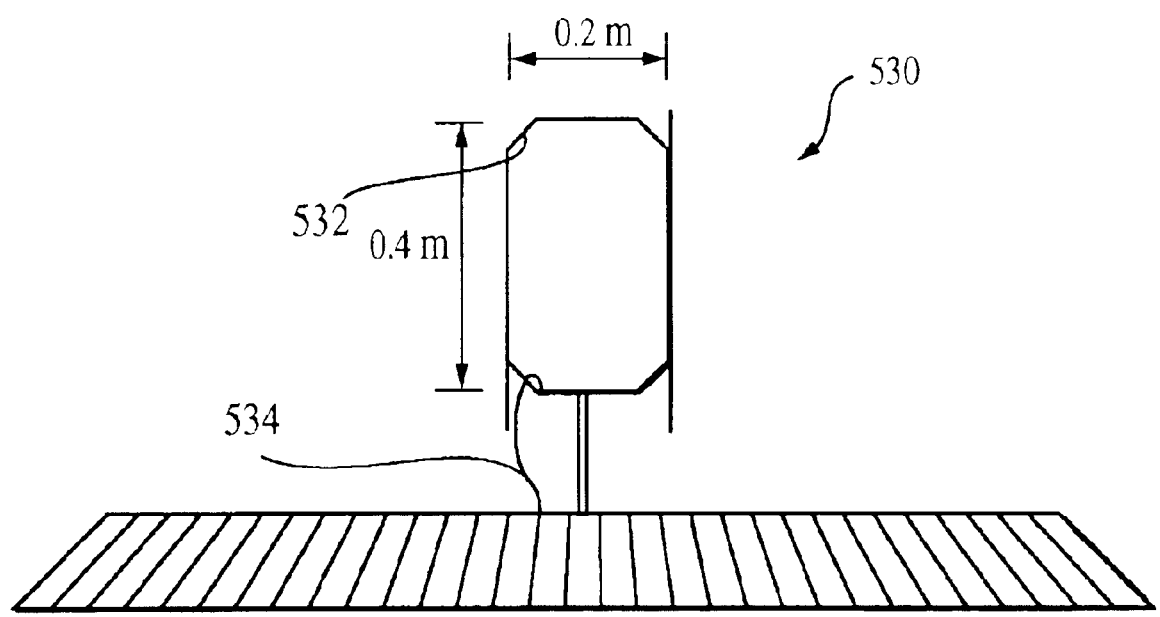
FIG. 11C is a view of a subscriber remote station for use with the communications system illustrated in FIG. 17A.

As depicted in FIG. 11C, a subscriber remote station 530 would preferably include an antenna 532 appropriate to the wireless standard used by the subscriber remote station's related ground base station. These subscriber remote stations would have wired or wireless networked connections 534 to the individual devices of the subscribers.

As can be seen from the above description of this distribution system, this aspect of the invention provides for an information distribution system without the installation of an extensive infrastructure. Instead, the system requires only individual subscriber base stations located with the subscribers, or other ground stations, and one or more preferably high altitude, suborbital platforms providing communication links to and between the ground stations.

In further support of the above described embodiments, some preferred parameters include the following:

The airplane operates in the 60,000–70,000 foot realm, above normal air traffic and storms, and where the maximum strength winds are much lower speed than at lower jet stream regions.

The airplane can be powered by any suitable means, for example solar power, batteries, or fuel burned to create electrical or mechanical power through fuel cells, ICEs, or turbines.

The airplane is capable of relatively slow flight, a requirement both for long duration and maneuvering for close stationkeeping.

Multiple antennas on an airborne stabilized platform (stabilized in direction and altitude) send and receive signals from a pattern of ground areas. The beams are moderately broad, for example 10°–20°.

The more numerous send-receive ground antennas support narrow beams, for example 2°–4°.

The ground antenna beams are fixed in direction and elevation angle so that all point toward the center of the stationkeeping flight trajectory volume; the stationkeeping airplane stays within the beams.

Additional beams can be sent between the airplane and a central ground control station, via a fixed-orientation ground antenna.

The directivity of the airborne and ground antenna system permits reuse of frequencies to provide broadband service to many customers.

While particular forms of the invention have been illustrated and described, it will be apparent that various modifications can be made without departing from the spirit and scope of the invention. For example, aspects of different described embodiments can be combined to create other embodiments of the invention. Thus, although the invention has been described in detail with reference only to the preferred embodiments, those having ordinary skill in the art will appreciate that various modifications can be made without departing from the invention. Accordingly, the invention is not intended to be limited by the above discussion, and is defined with reference to the following claims.

I claim:

1. A method of maintaining a communications link between a ground station and a suborbital platform, wherein the ground station communicates using an antenna that provides a communication signal of limited beamwidth, comprising:

positioning the suborbital platform and aiming the antenna such that the suborbital platform is within the beamwidth of the antenna's signal;

maintaining the antenna's aim in a fixed orientation; and flying the suborbital platform in a pattern that maintains the suborbital platform within the beamwidth of the signal.

2. The method of claim 1, wherein the airplane is substantially maintained within a geostationary station delimited by a 4000-foot diameter circle and a 100-foot altitude range.

3. The method of claim 1, wherein the step of flying is continued for at least 200 hours.

4. The method of claim 1, wherein the step of flying is continued for at least 3000 hours.

5. The method of claim 1, wherein the suborbital platform is an airplane.

6. A communications system for communicating between a satellite and a ground station, comprising:

a downward-pointing communications antenna on the satellite, the downward-pointing antenna having a limited signal beam-width;

an upward-pointing communications antenna on the ground station, the upward-pointing antenna having a limited signal beam-width, wherein the downward-pointing antenna and the upward-pointing antenna are aimed such that they delimit a geostationary region of airspace that is within both signal beam-widths; and a suborbital platform configured to fly a pattern entirely within the delimited region of airspace.

7. The communication system of claim 6, wherein the suborbital platform is substantially maintained within a geostationary station delimited by a 4000-foot diameter circle and a 100-foot altitude range.

8. A communication system, comprising:

a ground station;

a spacecraft in geosynchronous orbit, the ground station and the spacecraft having communications systems that are characterized by operating with given beamwidths; and a suborbital platform maintained at a non-equatorial latitude that prevents the ground station from being within the beamwidth of communication signals transmitted by the spacecraft toward the suborbital platform, and that prevents the spacecraft from being within the beamwidth of communication signals transmitted by the ground station toward the suborbital platform;

wherein the ground station maintains both a direct communications signal and an indirect communications signal with the spacecraft, the indirect communications signal being directed to the suborbital platform which relays the signal to the spacecraft; and wherein the direct and indirect communications signals from the ground station use the same wavelengths.

9. The communication system of claim 8, wherein the suborbital platform is configured to operate for at least 200 hours.

10. The communication system of claim 8, wherein the suborbital platform is configured to operate for at least 3000 hours.

11. The communication system of claim 8, wherein the suborbital platform is configured to maintain the airplane within a station delimited by a 4000-foot diameter circle and a 100-foot altitude range.

12. A communication apparatus for communicating data between a terrestrial gateway and a plurality of terrestrial terminals, comprising:

an airplane flying within a geostationary station; and a network carried by the airplane, and having at least three downward-pointing communication devices, each communication device defining a beamwidth for communication, the communication devices' beamwidths delimiting distinct terrestrial communication cells that include the terminals when the airplane is aloft in a predetermined station;

wherein the network is configured to maintain a communications signal carrying the data with the gateway;

wherein the communications devices are configured to route the data carried by the communication signal between the network and the plurality of terminals; and wherein each terminal has a terminal antenna configured for carrying the communication signal, the terminal antenna being configured such that the airplane's entire flight station falls within the terminal antenna's beamwidth without any adjustment of the terminal antenna's aim.

13. The communications system of claim 12, wherein:

the network is configured to maintain additional communications signals carrying additional data with additional gateways; and the communications devices are further configured to route the data carried by the additional communication signals between the network and the plurality of terminals.

14. The communications system of claim 12, wherein the communications device is carried by an airplane configured to stay aloft without refueling for at least 200 hours.

15. The communications system of claim 12, wherein the communications device is carried by an airplane configured to stay aloft without refueling for at least 3000 hours.

16. The communications system of claim 12, wherein the terminal antenna includes no active tracking mechanism.

17. A communication system for communicating data between one or more gateways and a plurality of terrestrial terminals, each terminal having an antenna characterized by an orientation and a beamwidth, comprising:

a plurality of airplanes including a first airplane and a second airplane, each airplane stationkeeping within a geostationary flight station; and a plurality of networks, each airplane carrying a network, each network having at least three downward-pointing communication devices, each communication device defining a beamwidth for communication, the communication devices' beamwidths delimiting distinct terrestrial communication cells that include the terminals when the airplane is aloft in its respective flight station;

wherein the networks of the first airplane and the second airplane are configured to communicate with terminals in one or more of the same communication cells using the same wavelengths;

wherein each network is configured to maintain communications with the one or more gateways;

wherein each communications device is configured to route data carried by its respective network's gateway communications between its respective network and one or more of the plurality of terminals; and wherein each airplane's respective station is outside of the oriented beamwidths of the terminal antennas that are in communication with other airplanes.

18. The communications system of claim 17, wherein each airplane is configured to stay aloft without refueling for at least 200 hours.

19. The communications system of claim 17, wherein each airplane is configured to stay aloft without refueling for at least 3000 hours.

20. The communications system of claim 17, wherein each terminal antenna is configured such that the entire station of the airplane, with which it is in communication, falls within the terminal antenna's beamwidth without any adjustment of the terminal antenna's orientation.

21. The communications system of claim 20, wherein the terminal antenna includes no active tracking mechanism.

* * * * *